United States Patent
Parthasarathy et al.

(10) Patent No.: US 10,753,499 B2
(45) Date of Patent: Aug. 25, 2020

(54) PROPORTIONAL CONTROL VALVE SYSTEM AND METHOD

(71) Applicant: Expro Americas, LLC, Houston, TX (US)

(72) Inventors: Anand Parthasarathy, Cypress, TX (US); Scott Charles, Houston, TX (US)

(73) Assignee: Expro Americas, LLC, Houston, TX (US)

( * ) Notice: Subject to any disclaimer, the term of this patent is extended or adjusted under 35 U.S.C. 154(b) by 59 days.

(21) Appl. No.: 15/966,730

(22) Filed: Apr. 30, 2018

(65) Prior Publication Data

US 2018/0313458 A1    Nov. 1, 2018

Related U.S. Application Data

(60) Provisional application No. 62/491,344, filed on Apr. 28, 2017.

(51) Int. Cl.
| | |
|---|---|
| *F16K 31/05* | (2006.01) |
| *F16K 31/04* | (2006.01) |
| *F16K 31/16* | (2006.01) |
| *F16K 37/00* | (2006.01) |
| *F16K 31/50* | (2006.01) |

(52) U.S. Cl.
CPC ............ *F16K 31/05* (2013.01); *F16K 31/046* (2013.01); *F16K 31/047* (2013.01); *F16K 31/16* (2013.01); *F16K 31/508* (2013.01); *F16K 37/0041* (2013.01)

(58) Field of Classification Search
CPC ...... F16K 31/05; F16K 31/508; F16K 31/046; F16K 31/16; F16K 31/047; F16K 37/0041
See application file for complete search history.

(56) References Cited

U.S. PATENT DOCUMENTS

| | | | | |
|---|---|---|---|---|
| 1,764,936 A | * | 6/1930 | Payne | F16K 31/05 192/150 |
| 2,319,842 A | * | 5/1943 | Benson | F16K 31/05 74/52 |
| 2,324,211 A | * | 7/1943 | Hodgson | F16K 31/05 192/150 |
| 2,859,639 A | * | 11/1958 | Bryant | F16K 31/05 74/625 |

(Continued)

FOREIGN PATENT DOCUMENTS

WO    WO2010124600    11/2010

OTHER PUBLICATIONS

International search report for PCT/US2018/030196 dated Jul. 31, 2018.

*Primary Examiner* — Umashankar Venkatesan

(74) *Attorney, Agent, or Firm* — Getz Balich LLC

(57) ABSTRACT

A proportional control valve system and a method for operating the same is provided. The system includes a proportional control valve (PCV), an electric motor, a worm gear drive, and a programmable drive. The proportional control valve has a sealing structure that is positionable in a closed position, a fully open position, and a plurality of partially open positions there between. The worm gear drive is in driving communication with the sealing structure of the proportional control valve. The programmable drive is operable to control the positioning of the sealing structure within the proportional control valve.

16 Claims, 3 Drawing Sheets

(56) References Cited

U.S. PATENT DOCUMENTS

| | | | | |
|---|---|---|---|---|
| 2,989,878 A | * | 6/1961 | Denkowski | F16K 31/05 |
| | | | | 74/625 |
| 3,176,531 A | * | 4/1965 | Plume | F16K 31/05 |
| | | | | 74/365 |
| 4,771,807 A | * | 9/1988 | Karani | F16K 31/05 |
| | | | | 137/553 |
| 4,816,987 A | | 3/1989 | Brooks et al. | |
| 6,883,614 B2 | | 4/2005 | Schmidt et al. | |
| 2009/0078898 A1 | | 3/2009 | Sasaki et al. | |
| 2009/0289494 A1 | * | 11/2009 | Landesfeind | B60T 8/36 |
| | | | | 303/119.2 |
| 2017/0292628 A1 | * | 10/2017 | Dolenti | F16K 37/0041 |

* cited by examiner

PROPORTIONAL CONTROL VALVE SYSTEM AND METHOD

The present application is entitled to the benefit of and incorporates by reference essential subject matter disclosed in the U.S. Provisional Patent Application Ser. No. 62/491,344, filed on Apr. 28, 2017.

BACKGROUND OF THE INVENTION

1. Field of the Invention

The present invention relates to proportional control valves in general, and to linear proportional control valves in particular.

2. Description of the Related Art

Valves are frequently used to control a flow/distribution of one or more fluids. Electric actuation of a valve is commonly used in, e.g., the oil and gas industry. Some valves are designed to be actuated into one of two states; e.g., either fully open or fully closed. Examples of such valves include gate valves, plug valves, etc. A proportional control valve (sometimes referred to as a "choke" or a "choke valve"; hereinafter referred to as a "PCV") in contrast, is configured so that it may be actuated in a continuum of different states, from a fully open state (100% open) to a fully closed state (0% open), and a plurality of open states there between (e.g., 10% open, 20% open, 30% open, etc.). An example of such a valve is disclosed in U.S. Pat. No. 6,883,614, which patent is hereby incorporated by reference in its entirety. The '614 Patent describes a choke valve combined with an actuator. The choke valve includes an inlet flow passage, an outlet flow passage, and an internal linearly translatable sealing structure. The sealing structure may be linearly translated between a first position where zero fluid flow is permitted between the inlet flow passage and the outlet flow passage, and a second position where a maximum fluid flow is permitted between the inlet flow passage and the outlet flow passage. Positioning the sealing structure at various different positions between the first and second position varies the amount of fluid flow that can be passed through the choke valve; e.g., 10% of maximum, 20% of maximum, 30% of maximum, etc. The actuator may include an electric motor to drive the linear translation of the choke valve sealing structure.

Some prior art PCVs powered by an electric motor may inherently have one or more operational challenges. For example, the actuation of many electrically actuated prior art PCVs are limited because the electric motor is either controlled to operate at a fixed maximum revolutions per minute (RPM), or is controlled to operate at a limited number of speed settings. Hence, these prior art PCVs either lack the ability to adjust the speed of the actuating motor (and therefore the PCV) altogether, or are limited to a few predetermined speeds. PCVs utilized in the oil/gas industry often have application speed requirements (e.g., a maximum allowable time for transitioning from open to closed, or vice versa), as well as minimum torque requirements to enable the PCV to have a "drop tight seal". As used herein, the expression "drop tight seal" refers to a seal where leakage or a drop in pressure within the PCV (i.e., the choke) is zero or negligible. The speed and torque requirements can operationally conflict with one another.

Many prior art PCVs with the aforesaid speed adjustment limitations (e.g., a single actuating motor speed, or a limited number of fixed actuating speeds), often deviate from ideal/theoretical PCV sealing structure movement. In some operational modes, therefore, the prior art PCVs lack sealing structure positional accuracy (i.e., the % the valve is open or closed) and/or positional repeatability. This lack of positional accuracy and consequent deviation in opening/closing percentage accuracy can negatively affect the performance of the PCV in certain well control methodologies such as managed pressure drilling (MPD) operations. FIG. 1 illustrates an exemplary trim flow curve for a PCV. The curve indicates a Y-axis representing flow coefficient ($C_v$) values versus an X-axis representing "percent open"; i.e., the percentage that the PCV is open (100% is completely open, and 0% is completely closed). As can be seen from the curve, in certain portions of the curve, the flow coefficient changes relatively little as a function of the percent open. In other portions of the curve, however, the flow coefficient changes significantly as a function of the percent open. In these later regions, consequently, being able to accurately and repeatedly control the percent open of the PCV is key in being able to accurately control the flow coefficient (e.g., the fluid flow through the PCV). There is significant advantage, therefore, in accurately controlling the PCV in MPD and similar type well control methodologies.

Many prior art electrically actuated PCVs also experience a time lag (frequently on the order of one to two seconds) prior to movement; e.g., movement from a first position to a second position. This time lag negatively affects the ability of the PCV to provide a continuous duty cycle that is desirable in well control methodologies where well pressures are closely controlled; e.g., such as a MPD system. Indeed, many prior art PCVs are typically not rated for continuous usage.

Many prior art electrically actuated PCVs lack communication or data transmission capability (e.g., transmissions pertaining to temperature, torque, velocity of travel when adjusted, etc.). Thus, the operation of a well system incorporating a prior art PCV may be somewhat "blind" in terms of the PCV performance.

Finally, in many prior art electrically actuated PCVs the electric motor has a maximum torque setting and the motor is operated at that maximum torque setting without regard to the amount of torque actually required for the particular PCV operation at hand. For example, when the PCV is operated to a fully closed position, many prior art electrically operated PCVs maintain the motor at a maximum torque setting even after the PCV reaches the fully closed position, which can lead to excessive electric motor strain and heating.

What is needed is a PCV that addresses these shortcomings.

SUMMARY

According to an aspect of the present disclosure, a proportional control valve system is provided. The system includes a proportional control valve, an electric motor, a gearbox, a worm gear drive, and a programmable drive. The proportional control valve has a sealing structure, an inlet flow passage, and an outlet flow passage. The sealing structure is positionable in a closed position, a fully open position, and a plurality of partially open positions there between. The gearbox is in driving communication with the electric motor. The worm gear drive is in driving communication with the gearbox, and in driving communication with the sealing structure of the proportional control valve. The programmable drive has a computing device in communication with a memory device storing executable instructions, the instructions when executed cause the computing device to control the positioning of the sealing structure within the proportional control valve.

According to another aspect of the present disclosure, a method of operating a proportional control valve system such as that described above and herein is provided. In the method, the programmable drive and the computing device provided therein are used to positionally control the sealing structure within the proportional control valve.

In any of the aspects or embodiments described above and herein, the worm gear drive may include a rotatable input shaft and a linearly translatable output shaft. The rotatable input shaft is in communication with the gearbox and the linearly translatable output shaft is in communication with the sealing structure of the proportional control valve.

In any of the aspects or embodiments described above and herein, the system may include a first positional indicator and a second positional indicator. The first positional indicator is in communication with the electric motor, and is configured to indicate a rotational position of a rotational output shaft of the electric motor. The second positional indicator is configured to indicate the position of the sealing structure within the proportional control valve. In the method, the step of using the computing device to execute the stored instructions to positionally control the sealing structure within the proportional control valve may include controlling an output shaft of the motor to a rotational position based on input from one or both of the first positional indicator or the second positional indicator, which motor rotational position corresponds to a desired position of the sealing structure within the proportional control valve.

In any of the aspects or embodiments described above and herein, the stored executable instructions when executed may cause the computing device to control a rate of linear movement of the sealing structure within the proportional control valve by controlling a rotational speed of the electric motor. The method may include a step of controlling a rate of linear movement of the sealing structure within the proportional control valve by controlling a rotational speed of the electric motor. The method may include a step of controlling a rate of linear movement of the sealing structure within the proportional control valve by controlling a rotational speed of the electric motor.

In any of the aspects or embodiments described above and herein, the stored executable instructions when executed may cause the computing device to control at least one of an acceleration or a deceleration of the sealing structure within the proportional control valve by controlling the rotational speed of the electric motor. In the method, the step of controlling the rate of linear movement of the sealing structure may further include controlling at least one of an acceleration or a deceleration of the sealing structure within the proportional control valve.

In any of the aspects or embodiments described above and herein, the stored executable instructions when executed cause the computing device to control an amount of torque produced by the electric motor. The method may include controlling an amount of torque produced by the electric motor.

In any of the aspects or embodiments described above and herein, the stored executable instructions when executed may cause the computing device to control the amount of torque produced by the electric motor as a function of fluid pressure within the proportional control valve. In the method, the step of controlling the amount of torque produced by the electric motor may include controlling the amount of torque produced by the electric motor as a function of fluid pressure within the proportional control valve.

In any of the aspects or embodiments described above and herein, the stored executable instructions when executed may cause the computing device to control the electric motor to produce a first amount of torque to establish a drop tight seal when the sealing structure is in the closed position, and to produce a second amount of torque to maintain the drop tight seal when the sealing structure is in the closed position, which second amount of torque is less than the first amount of torque. In the method the step of controlling the amount of torque produced by the electric motor may include producing a first amount of torque to establish a drop tight seal when the sealing structure is in the closed position, and producing a second amount of torque to maintain the drop tight seal when the sealing structure is in the closed position, which second amount of torque is less than the first amount of torque.

In any of the aspects or embodiments described above and herein, the proportional control valve system may further include a fluid powered actuator in communication with the worm gear drive and a reserve source of fluid power adequate for the fluid powered actuator to actuate the sealing structure of the proportional control valve. The method may include operating the fluid powered actuator to actuate the sealing structure of the proportional control valve.

In any of the aspects or embodiments described above and herein, the fluid powered actuator may be hydraulically powered or pneumatically powered, and the reserve source of fluid powered may be an accumulator.

In any of the aspects or embodiments described above and herein, the operation of the fluid powered actuator to actuate the sealing structure of the proportional control valve may be performed when the electric motor is inoperable.

The foregoing has outlined rather broadly several aspects of the present invention in order that the detailed description of the invention that follows may be better understood. Additional features and advantages of the invention will be described hereinafter which form the subject of the claims of the invention.

BRIEF DESCRIPTION OF THE DRAWINGS

The present disclosure is illustrated by way of example and not limited in the accompanying figure(s) in which like reference numerals indicate similar elements. The drawing figure(s) are not necessarily drawn to scale unless specifically indicated otherwise.

DETAILED DESCRIPTION

Figure 1:
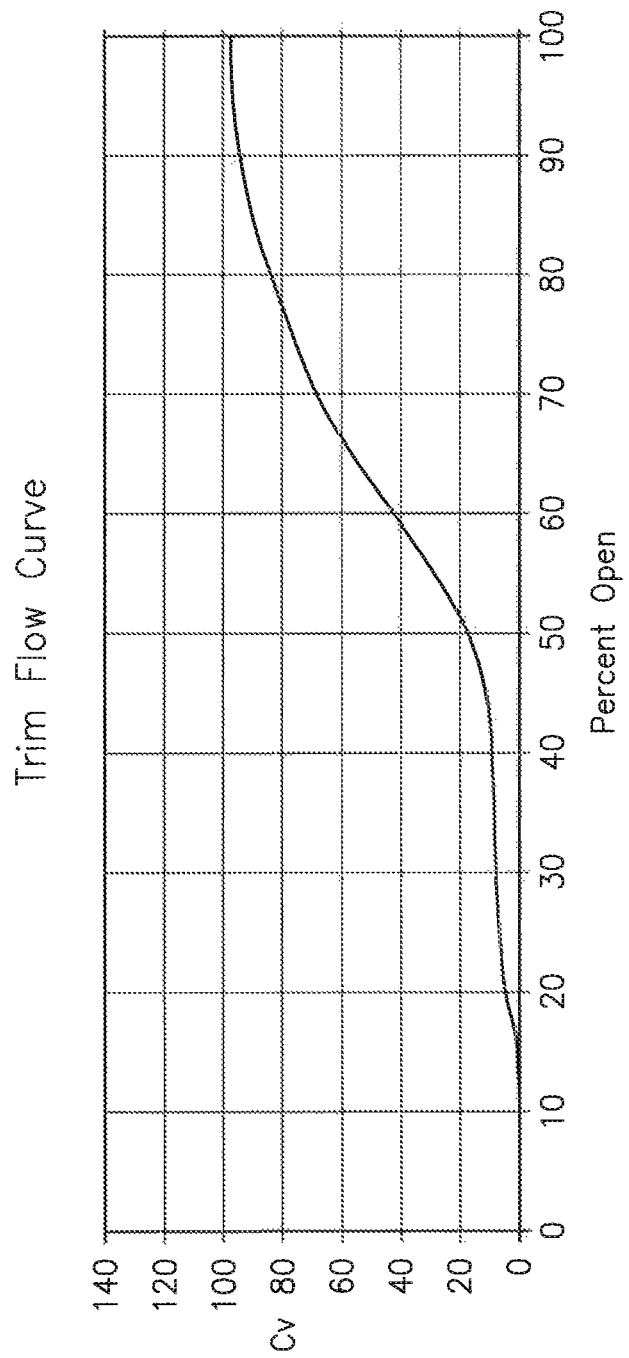
FIG. 1 is an exemplary trim flow curve for a proportional control valve, having a Y-axis representing flow coefficient ($C_v$) and an X-axis representing PCV "percent open".

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Figure 2:
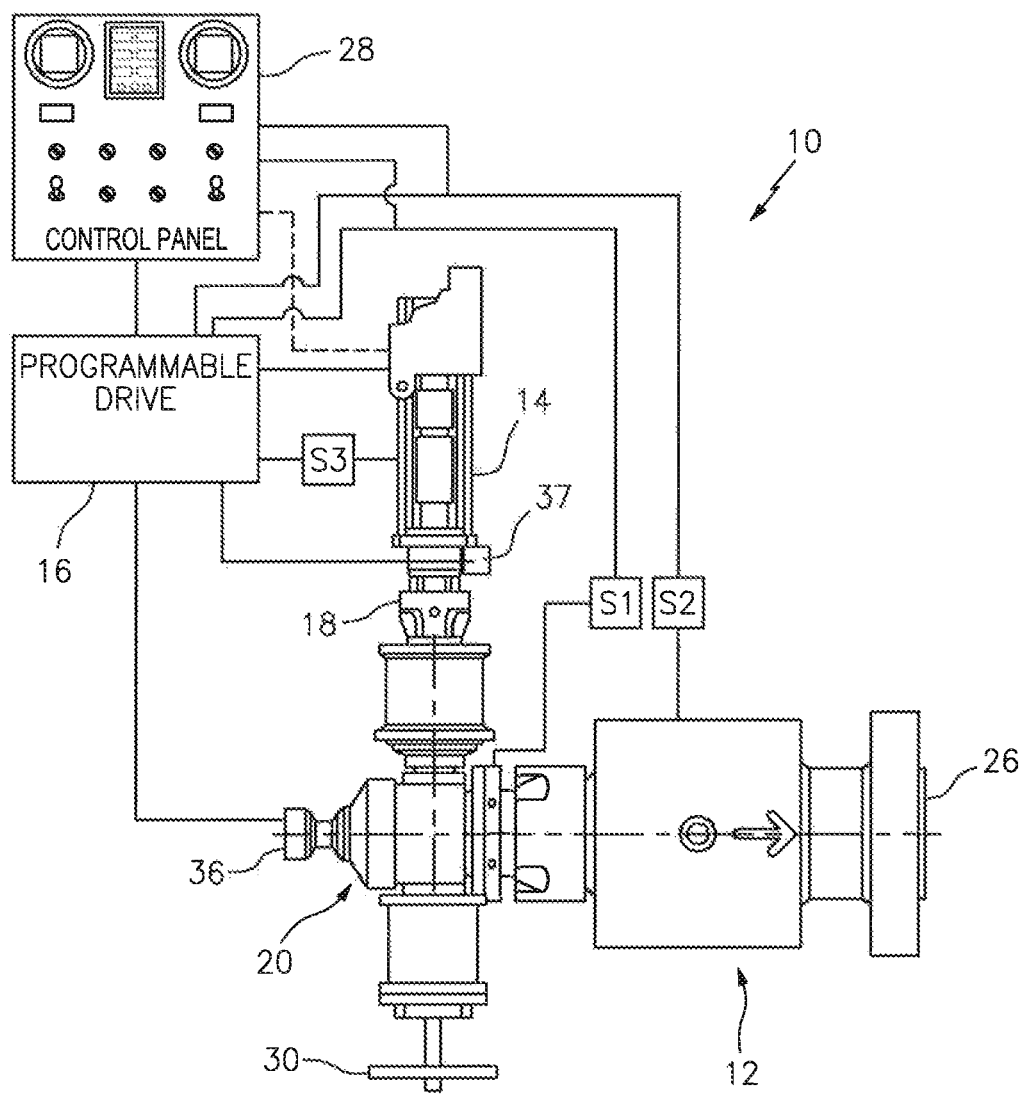
FIG. 2 is a diagrammatic view of a proportional valve system embodiment.
Figure 3:
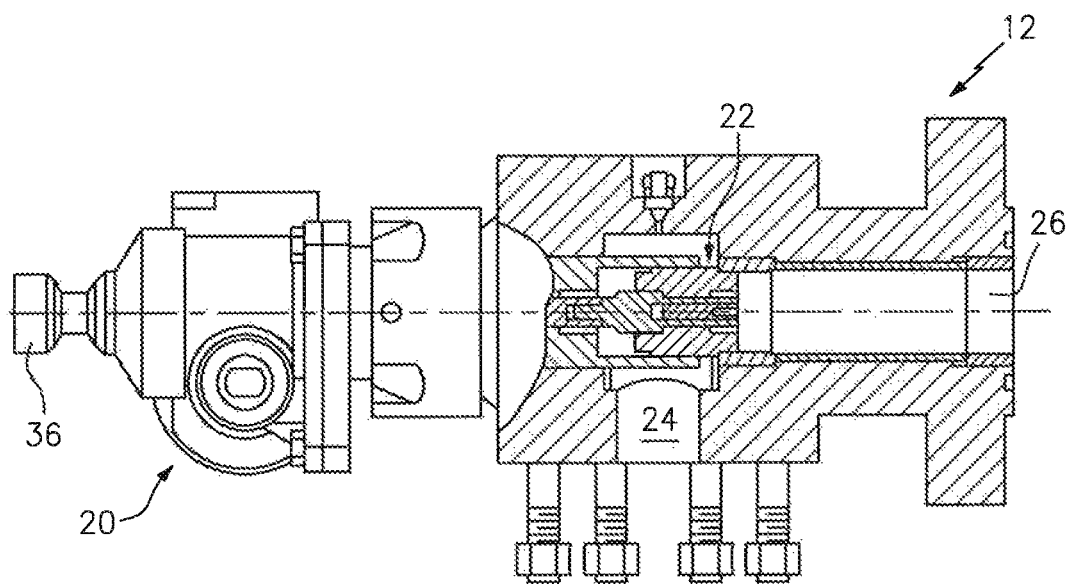
FIG. 3 is a partial view of a proportional valve system embodiment, including a sectioned PCV.

Referring to FIGS. 2 and 3, the present disclosure includes a proportional control valve system 10 that includes a proportional control valve ("PCV") 12, an electric motor 14, a programmable drive 16, a gearbox 18, and a worm gear drive 20. The PCV system may include or be in communication with a control station 28. The PCV 12 may be coupled to an output shaft of the worm gear drive 20 using an adapter. An input shaft of the worm gear drive 20 may be coupled with the gearbox 18 using an adapter. The gearbox 18 may be directly connected, or connected via an adapter, to the motor 14. Rotation of the input shaft of the worm gear drive 20 in a first rotational direction (e.g., clockwise) causes linear translation of the output shaft of the worm gear drive 20 (and the PCV sealing structure 22) in a first linear direction. Rotation of the input shaft of the worm gear drive 20 in a second rotational direction (e.g., counter clockwise) causes linear translation of the output shaft of the worm gear drive 20 (and the PCV sealing structure 22) in a second linear direction (i.e., opposite the first linear direction). The worm gear drive 20 provides torque multiplication and speed reduction, and also resists back driving of the PCV 12 in communication with the output shaft of the worm gear drive 20. The gearbox 18 is also configured to provide torque multiplication and speed reduction.

The PCV 12 includes an internal linearly translatable sealing structure 22, an inlet flow passage 24, and an outlet flow passage 26. The non-limiting sealing structure 22 shown in FIG. 3 is a gate and seat type sealing structure. The sealing structure 22 is linearly translatable between a first position where zero fluid flow (0% flow) is permitted between the inlet flow passage 24 and the outlet flow passage 26, and a second position where a maximum fluid flow (100% flow) is permitted between the inlet flow passage 24 and the outlet flow passage 26, and a continuum of positions there between. The sealing structure 22 may be positioned at any one of the continuum of different positions between the first and second position to vary the amount of fluid flow that can be passed through the PCV 12; e.g., a third position associated with a 10% of maximum flow, a fourth position associated with 20% of maximum flow, a fifth position associated with 30% of maximum flow, etc. As will be explained below, the specific position of the PCV sealing structure 22 (and consequent flow %) within the continuum of possible positions may be dictated by a variety of different inputs into the programmable drive 16, and can be accomplished, for example using positional indicators. The present disclosure is not limited to any particular type of PCV having a linearly translatable sealing structure 22. U.S. Pat. No. 6,883,614 describes a non-limiting acceptable example of a PCV 12 (referred to as a "choke valve" therein).

The electric motor 14 utilized within the present PCV system 10 is sized and configured to ensure sufficient PCV 12 performance for the particular application, and therefore may vary from application to application. The electric motor 14 may be configured to be driven by an AC drive that accepts such as 480 VAC or 230 VAC 3-phase current, or 110 VAC single phase current, etc. The electrical motor 14 utilized within the present PCV system 10 is not limited to an AC motor, and/or any particular electrical power source configuration.

As will be described in more detail below, the electric motor 14 is controlled to drive the gearbox 18, which in turn drives the input shaft of the worm gear drive 20. The input shaft of the worm gear drive 20 drives the linearly translatable output shaft of the worm gear drive 20. The linear translation output shaft of the worm gear output shaft linearly drives the sealing structure 22 of the PCV 12, thereby adjusting the fluid flow path through the PCV 12.

The programmable drive 16 includes any type of computing device, computational circuit, or any type of process or processing circuit capable of executing a series of instructions that are stored in memory, including instructions for accomplishing tasks associated with the methodologies described herein. For example, the programmable drive 16 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the PCV 12, the motor 14, etc., and the stored instructions are not limited to any particular form (e.g., program files, system data, buffers, drivers, utilities, system programs, etc.) provided they can be executed by the controller. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the programmable drive 16 may be achieved via the use of hardware, software, firmware, or any combination thereof. The programmable drive 16 may include one or more input devices (e.g., a keyboard, a touch screen, communication input ports, terminals, wireless communication devices, sensors, etc.) and/or one or more output devices (a monitor, data readouts, communication output ports, terminals, wireless communication devices, sensors, etc.) that enable signals and/or communications to be sent to and/or provided from the programmable drive 16.

In some embodiments, the programmable drive 16 may be in communication with one or more control stations 28 (that may include one or more computing devices, computational circuits, or any type of process or processing circuit capable of executing instructions that are stored in memory, as described above) that permit an operator to input instructions into the programmable drive 16, and/or to receive output from the programmable drive 16. The programmable drive 16 and/or the control station 28 may be in communication with various different well rig operational components (e.g., valves, pressure sensors, temperature sensors, manifolds, mud pumps, a rig air sources, hydraulic power units, various different manifolds, fluid reservoirs, mud pump systems, etc.; shown schematically as "S1", "S2", "S3" in FIG. 2), and other well operation components that are useful in performing the methodological functions described herein. As an example, the programmable drive 16 may be configured (e.g., via stored instructions) to receive signals/data from various different input sources (e.g., the temperature of the motor 14 or the drive, amperage, torque, voltage, speeds, etc.) and use those signals to discover trends, predict when component lifetimes are nearing an end to facilitate preventative maintenance activities, etc. In addition, the data inputs can be used as the basis for performance adjustments.

Communications between the programmable drive 16 and the motor 14 and/or communications between the programmable drive 16 and other well rig components (e.g., a control station 28) may be accomplished via hardwire or by wireless communication devices. The present disclosure is not limited to any particular communications protocols, standards, etc.; e.g., profinet, TCP/IP, Modbus, etc. In some embodiments, the system may include one or more dedicated communication channels, and/or may include structure for shared channels (potentially as part of a multiplexing scheme or bus architecture). A channel may be used to transmit and/or receive power signals, data signals, communications, etc.

As indicated above, the programmable drive 16 and/or the control station 28 each may be configured to execute stored instructions that when executed cause the respective device to perform certain functions. The methodologies and functions described herein are examples of methodologies and functions that may be performed, but the present disclosure is not limited to these particular examples.

The programmable drive 16 is configured (e.g., via hardware and/or instructions) to communicate (e.g., transmit and/or receive signals) with one or both of the control station 28 and the motor 14 to control the operation of the PCV 12 in particular modes of system operation. The operational control of the PCV may be solely dictated by the stored instructions, or may dictated by a combination of the stored instructions and operator input, or may be solely dictated by operator instructions. The present disclosure's ability to control the operation of the PCV 12 in a plurality of different modes of operation provides considerable and desirable flexibility to the operator. For example, the programmable drive 16 may be configured to control the PCV 12 in modes of operation relating to managed pressure drilling ("MPD") techniques. MPD drilling techniques are well known to those of ordinary skill in the art. Simply stated, MPD drilling techniques may be described as adaptive drilling processes that are used to precisely control an annular pressure profile throughout a wellbore. MPD drilling techniques provide a closed-loop circulation system in which pore pressure, formation fracture pressure, and bottom hole pressure are balanced and managed at surface. Drilling fluid is supplemented by surface backpressure, which can be adjusted much faster in response to downhole conditions compared with changing mud weights conventionally. By accurately controlling the annular pressure profile within the wellbore, the operator in most instances is able to drill beyond conventional limits of depth and pressure variation. The present disclosure, including the programmable drive 16 and PCV 12, facilitate the aforesaid accurate control of the annular pressure profile. For example, when a wellbore pressure is sensed outside of a window of acceptable pressures, signals indicative thereof may be sent to the programmable drive. Upon receipt of such signal, the stored instructions cause the programmable drive to actuate the PCV (e.g., via the motor) in a manner that addresses the well pressure issue and reestablishes the wellbore pressure within the window of acceptable pressures. The present disclosure is not limited to use with MPD applications and may be used with other operational applications such as, but not limited to, well control applications, flow back applications, etc.

Operation of the present disclosure PCV system 10 includes accurate control and positioning of the sealing structure 22 within the PCV 12. As stated above, the sealing structure 22 within the PCV 12 may be positioned in a closed flow position (e.g., where zero fluid flow, or only a negligible amount of fluid flow is permitted through the PCV 12) and in a fully open flow position (e.g., where a maximum volume of fluid flow is permitted through the PCV 12), and a continuum of fluid flow positions there between. The fluid flow path through the PCV 12 is between the inlet flow passage and the outlet flow passage of the PCV 12. The sealing structure 22 is linearly translatable within the PCV 12 between the open flow position and the closed flow position.

To establish the PCV 12 in a particular operational setting (e.g., fully open, partially open/closed, fully closed) the programmable drive 16 sends an appropriate electrical power signal (e.g., voltage and current) to the motor 14 and may also send and/or receive communication signals to/from the motor 14. The programmable drive 16 may condition and/or process the electrical power signals and communication signals to facilitate operation of the motor 14.

To set the PCV 12 at a particular fluid flow setting (i.e., to linearly translate the PCV sealing structure 22 to a position corresponding to the aforesaid fluid flow setting), the programmable drive 16 controls the motor 14 to rotate its output shaft in a particular direction. The rotation of the motor output shaft (which is coupled to the input shaft of the gear box) in turn drives the gearbox 18. The rotation of the input shaft of the gearbox 18 causes the output shaft of the gearbox 18 (which is connected to the input shaft of the worm gear drive 20) to rotate, which in turn causes the input shaft of the worm gear drive 20 to rotate. Rotation of the input shaft of the worm gear drive 20, in turn causes linear translation of the output shaft of the worm gear drive 20. Linear translation of the worm gear drive output shaft causes linear translation of the sealing structure 22 within the PCV 12. Ultimately, therefore, rotation of the motor 14 in a first direction (e.g., clockwise) causes linear translation of the sealing structure 22 within the PCV 12 in a first direction, and rotation of the motor 14 in a second direction (e.g., counterclockwise) causes linear translation of the sealing structure 22 within the PCV 12 in a second direction, opposite the first. Hence, the PCV 12 can be opened or closed by reversing the rotational direction of the motor 14, which rotational direction is controlled by the programmable drive 16. The programmable drive 16 may also control the motor 14 to not rotate and thereby control the PCV 12 to maintain a particular fluid flow setting (i.e., maintain the position of the PCV sealing structure 22 and therefore the corresponding fluid flow setting).

The programmable drive 16 may also be configured (e.g., via stored instructions) to control the linear speed of the sealing structure 22 of the PCV 12 by controlling the rotational speed of the motor 14. The programmable drive 16 is configured to control the motor speed (e.g., increase or decrease the motor output shaft RPMs) by transmitting the appropriate electrical power signals and in some instance communication signals pursuant to the stored instructions. The ability to accurately control the linear speed of the PCV sealing structure 22 provides several benefits; e.g., satisfaction of application speed requirements from full open PCV 12 to full close PCV 12, or vice versa, while at the same time providing desirable positional accuracy as will be described below.

In addition, the programmable drive 16 may be configured to selectively vary the motor speed pursuant to the stored instructions or via hardware components. For example, the programmable drive 16 may be configured (e.g., via stored instructions) to accelerate or decelerate the sealing structure 22 of the PCV 12 at predetermined rates by accelerating or decelerating the motor speed at predetermined rates. Controlling acceleration/deceleration of the PCV sealing structure 22 provides numerous benefits; e.g., it may enhance the operational performance of the PCV 12, it may improve the durability of the PCV system 10 components (e.g., avoid shock movements), it can avoid possible detrimental wear and tear or damage associated with mechanical end-of-travel impacts of the PCV sealing structure 22 within the PCV 12, etc. In addition, controlling the acceleration/deceleration of the PCV sealing structure 22 enhances the ability of the PCV 12 to change direction (e.g., open to closed, or vice versa) very rapidly.

The programmable drive 16 may also be configured (e.g., via stored instructions) to accurately control the position of the PCV sealing structure 22 and thereby accurately control the fluid flow through the PCV 12. For example, one or more positional indicators may be disposed within the PCV system 10 to indicate the location of elements within the PCV system. As a specific example, a first positional indicator 36 may be in communication with the output shaft of the worm gear drive 20, and configured to indicate the position of the output shaft of the worm gear drive 20. The position of the output shaft of the worm gear drive 20 relates directly to the position of the sealing structure 22 within the PCV. A second positional indicator 37 (e.g., a motor absolute encoder) may be in communication with the output shaft of the motor 14, which second positional indicator 37 is configured to indicate the rotational position of the motor shaft. The amount of linear travel of the worm gear drive output shaft (and therefore the amount of linear travel of the PCV sealing structure 22) for each rotation of the motor output shaft is known. After an initial synchronization, the programmable drive (via stored instructions) will know the relative positions of the PCV sealing structure 22 and the electric motor 14 output shaft via the positional indicators 36, 37. Hence, the programmable drive 16 can cause controlled, accurate movement of the PCV sealing structure 22 to a new position by controlling the motor 14 to rotate the motor output shaft the precise rotational amount required in the appropriate direction to accomplish the desired linear travel. In some embodiments, the positional accuracy capability can be increased by an appropriate gear ratio within the gearbox 18, and/or an appropriate gear ratio within the worm gear drive 20; e.g. the aforesaid gear ratios can provide relatively small PCV sealing structure 22 linear travel for a single rotation of the motor 14 output shaft. Embodiments of the present PCV system 10 may be configured to provide a PCV sealing structure 22 positional resolution on the order of 0.03% (or better) of the PCV sealing structure 22 stroke (e.g., from fully open to fully closed, or vice versa). In some instances, sufficient PCV sealing structure 22 positional resolution of the PCV sealing structure 22 stroke (e.g., from fully open to fully closed, or vice versa) may be attained with the worm gear drive 20 alone, thereby obviating the need for the gearbox 18. As indicated above, the ability to accurately control the position of the PCV sealing structure (and therefore the fluid flow through the PCV) is significant, particularly in well control methodologies such as managed pressure drilling (MPD) operations.

The programmable drive 16 may also be configured (e.g., via stored instructions) to accurately control the torque produced by the motor 14 in several different ways. For example, the programmable drive 16 may be configured to control the torque produced by the motor 14 pursuant to a particular predetermined profile. As another example, the programmable drive 16 may be configured to determine a level of motor torque required to accomplish the PCV task at hand; e.g., the amount of torque required to move the sealing structure 22 of the PCV 12 at a particular rate of translation in view of sensed condition, the amount of torque required to at least initially establish a drop tight seal when the PCV sealing structure 22 is drawn into a closed position, the amount of torque required to maintain a drop tight seal when the PCV sealing structure 22 is drawn into a closed position, etc. As another example, the programmable drive 16 may be configured to control the torque produced by the motor 14 as a function of the fluid pressure within the PCV; e.g., the amount of motor torque required to move the PCV sealing structure under lower pressure conditions will be less than the amount of motor torque required to move the PCV sealing structure under higher pressure conditions, or as a further example the amount of motor torque required to hold the PCV sealing structure in a closed position under lower pressure conditions will be less than the amount of motor torque required to hold the PCV sealing structure in a closed position under higher pressure conditions. The aforesaid fluid pressure may be sensed, for example, within piping connected with the PCV inlet flow passage. The ability of the programmable drive 16 to accurately control the torque produced by the motor 14 provides numerous benefits; e.g., the specific torque setting can be selected to accomplish the PCV task at hand, but stay within the limits to ensure operational parameters associated with the PCV 12 (and/or other parts of the PCV system 10) are not exceeded, the specific torque setting can be selected to facilitate establishment of continuous movement of the PCV sealing structure 22, etc. In particular, the specific torque structure can be selected to avoid excessive motor 14 burden and consequent heating. As indicated above, the programmable drive 16 can be configured to control the motor 14 to produce a first level of torque required to establish a drop tight seal when the PCV sealing structure 22 is drawn into a closed position, and a second lesser level of torque adequate to maintain the aforesaid drop tight seal. Decreasing the amount of torque produced by the motor 14 when the PCV sealing structure 22 is statically position in the closed position can decrease the amount of heat produced by and stress on the motor 14. In some embodiments, the programmable drive 16 may be configured to monitor the applied motor torque. The programmable drive 16 (and/or a control station 28) may display a value representative of the applied motor torque and may include functionality (e.g., alarms, etc.) to alert the operator in the event the applied motor torque is excessive, or actuate the PCV 12 to alleviate the excessive applied motor torque.

In some embodiments, the programmable drive 16 may be configured (e.g., via stored instructions) to actuate the PCV 12 in the event a sensed fluid pressure in piping either in communication with the PCV flow inlet passage 24 of the PCV flow outlet passage 26 exceeds a predetermined value; e.g., the programmable drive 16 can control the PCV to act as a pressure relief valve.

In some embodiments the PCV system 10 may be configured to permit manual actuation of the PCV 12. For example, as shown in FIG. 2, the worm gear drive 20 may include a hand wheel 30 engaged with the input shaft of the worm gear drive 20. The PCV 12 may be manipulated by rotating the input shaft of the worm gear drive 20. This aspect is of value in the event of a power outage.

Figure 4:
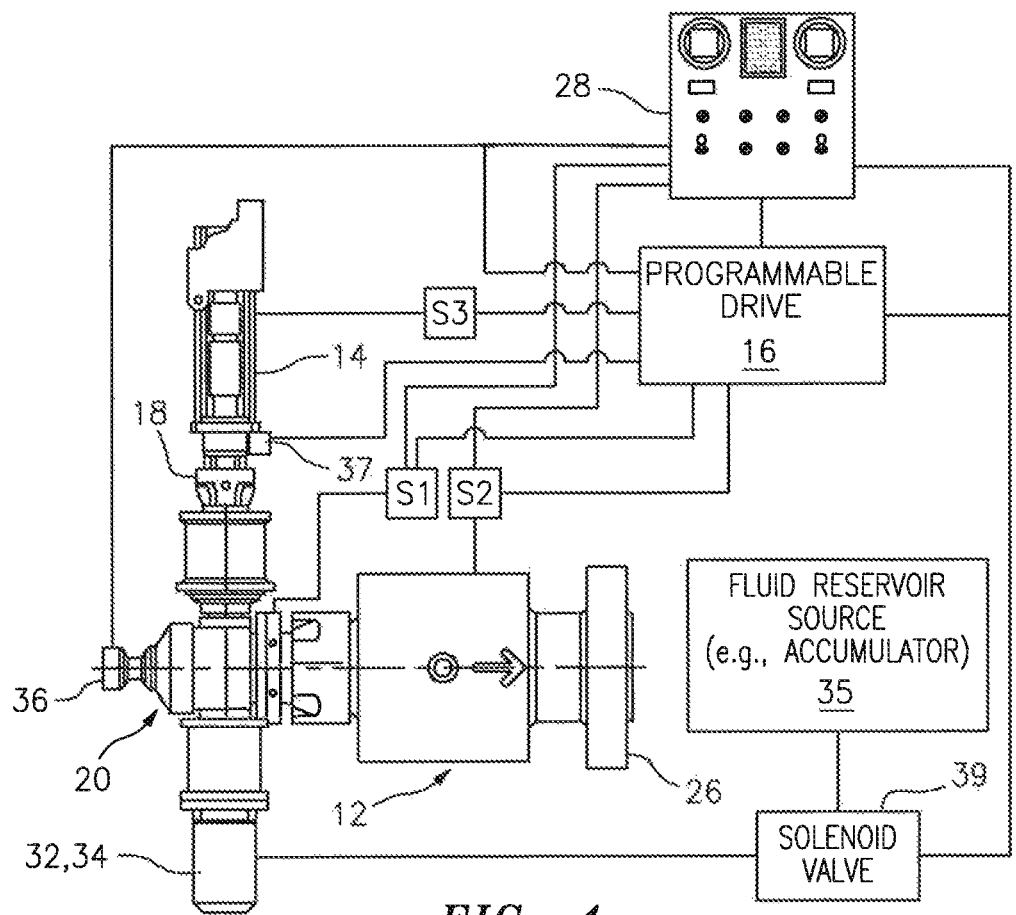
FIG. 4 is a diagrammatic view of a proportional valve system embodiment.

Referring to FIG. 4, in some embodiment the PCV system 10 may be configured to permit actuation of the PCV 12 by powered means other than the motor 14. For example, a hydraulic motor 32 or a pneumatic motor 34 may be engaged with the input shaft of the worm gear drive 20. The PCV system 10 may be configured such that a reserve source of hydraulic pressure 35 (e.g., an accumulator) is in communication with the hydraulic motor. In the event the electric motor 12 is unavailable (e.g., due to service, power outage, etc.), the hydraulic power available from the pressurized fluid within the accumulator can be used to operate the hydraulic motor and thereby control the PCV 12 (e.g., from an open position to a closed position, or vice versa). Similarly, in those embodiments that include a pneumatic motor, the PCV system 10 may be configured such that a reserve source of air pressure (e.g., rig air; or a pneumatic accumulator) is in communication with the pneumatic motor. In the event the electric motor 14 is unavailable (e.g., due to service, power outage, etc.), the power available from the pressurized air source can be used to operate the pneumatic motor and thereby control the PCV 12 (e.g., from an open position to a closed position, or vice versa). The ability of embodiments of the present PCV system 10 to actuate the PCV 12 when the electric motor 14 is unavailable is significant, particularly because the present PCV system 10 can be configured to permit actuation of the hydraulic or pneumatic motor from a position remote from the PCV. A hand wheel 30 affixed to the worm gear drive requires an operator to travel to and be physically present be at the PCV 12. Hence, when a hand wheel 30 is the only alternative means of actuating the PVC 12, it will take some amount of time for the operator to move to the PCV 12, and the operator will be exposed to the environment surrounding the PCV 12. The embodiments of the present PCV system 10 that are configured to permit actuation of the PCV via a hydraulic or pneumatic motor and a stored source of energy (e.g., an accumulator actuable via a battery powered solenoid valve 39), permit an operator to actuate the PCV from a position remote from the PCV, thereby eliminating the need/time required to travel to the PCV and the exposure to the environment surrounding the PCV.

As indicated above, the present PCV system 10, and its' ability to accurately control the operation of the PCV 12 can be a substantial advantage in well control methodologies like MPD that require continuous monitoring and adjustment to control the annular pressure profile throughout a wellbore. Operation of the present PCV system 10 may be coordinated with operations of other well rig systems (e.g., through the programmable drive 16 and/or a control station 28) to achieve the aforesaid pressure profile control. The programmable drive 16 permits continuous usage of the PCV 12; i.e., as inputs (e.g., pressure sensor inputs) are received into the programmable drive 16, the programmable drive 16 can continuously control the PCV 12 to produce the desired flow rate through the PCV 12.

An aspect of the present disclosure includes one or more methods for operating the embodiments of the proportional control valve system described above. For example, in a first such method a proportional control valve system that includes a proportional control valve, an electric motor, a gearbox, a worm gear drive, and a programmable drive is provided. As described above: a) the proportional control valve has a sealing structure, an inlet flow passage, and an outlet flow passage, the sealing structure positionable in a closed position, a fully open position, and a plurality of partially open positions there between; b) the gearbox is in driving communication with the electric motor; c) the worm gear drive is in driving communication with the gearbox, and in driving communication with the sealing structure of the proportional control valve; and d) the programmable drive includes a computing device in communication with a memory device storing executable instructions. The method includes using the programmable drive (e.g., including the computing device provided therewith) to execute stored instructions to positionally control the sealing structure within the proportional control valve.

In some method embodiments, the proportional control valve system includes a first positional indicator and a second positional indicator. The first positional indicator is in communication with the electric motor, and is configured to indicate a rotational position of a rotational output shaft of the electric motor. The second positional indicator is configured to indicate the position of the sealing structure within the proportional control valve. The sealing structure within the proportional control valve is positionally controlled by the programmable drive executing stored instructions; e.g., controlling an output shaft of the electric motor to a rotational position based on input from one or both of the first positional indicator or the second positional indicator, which motor rotational position corresponds to a desired position of the sealing structure within the proportional control valve.

In some method embodiments, the method includes controlling a rate of linear movement of the sealing structure within the proportional control valve by controlling a rotational speed of the electric motor. In some instances the step of controlling the rate of linear movement of the sealing structure may further include controlling at least one of an acceleration or a deceleration of the sealing structure within the proportional control valve.

In some method embodiments, the method includes controlling an amount of torque produced by the electric motor. The step of controlling the amount of torque produced by the electric motor may include controlling the amount of torque produced by the electric motor as a function of fluid pressure within the proportional control valve. The step of controlling the amount of torque produced by the electric motor may include producing a first amount of torque to establish a drop tight seal when the sealing structure is in the closed position, and producing a second amount of torque to maintain the drop tight seal when the sealing structure is in the closed position, which second amount of torque is less than the first amount of torque.

In some method embodiments, the proportional control valve system may further comprise a fluid powered actuator (e.g., a hydraulic actuator or a pneumatic actuator) in communication with the worm gear drive and a reserve source of fluid power (e.g., a charged accumulator) adequate for the fluid powered actuator to actuate the sealing structure of the proportional control valve. In these embodiments, the method may include operating the fluid powered actuator to actuate the sealing structure of the proportional control valve. In some instances, the fluid powered actuator can be used to actuate the sealing structure of the proportional control valve when the electric motor is inoperable. In some instances, the fluid powered actuator can be operated remotely by a solenoid valve (e.g., a battery operated solenoid valve).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A proportional control valve system, comprising:
   a proportional control valve having a sealing structure, an inlet flow passage, and an outlet flow passage, the sealing structure positionable in a closed position, a fully open position, and a plurality of partially open positions there between;
   an electric motor;
   a gearbox in driving communication with the electric motor;
   a worm gear drive in driving communication with the gearbox, and in driving communication with the sealing structure of the proportional control valve; and
   a drive having a computing device in communication with a memory device storing executable instructions, the instructions when executed cause the computing device to control the positioning of the sealing structure within the proportional control valve;
   wherein the stored executable instructions when executed cause the computing device to control an amount of torque produced by the electric motor as a function of fluid pressure within the proportional control valve.

2. The proportional control valve system of claim 1, wherein the worm gear drive includes a rotatable input shaft and a linearly translatable output shaft, wherein the rotatable input shaft is in communication with the gearbox and the linearly translatable output shaft is in communication with the sealing structure of the proportional control valve.

3. The proportional control valve system of claim 1, further comprising a first positional indicator and a second positional indicator, the first positional indicator in communication with the electric motor, and configured to indicate a rotational position of a rotational output shaft of the electric motor, the second positional indicator configured to indicate the position of the sealing structure within the proportional control valve.

4. The proportional control valve system of claim 1, wherein the stored executable instructions when executed cause the computing device to control a rate of linear movement of the sealing structure within the proportional control valve by controlling a rotational speed of the electric motor.

5. The proportional control valve system of claim 4, wherein the stored executable instructions when executed cause the computing device to control at least one of an acceleration or a deceleration of the sealing structure within the proportional control valve by controlling the rotational speed of the electric motor.

6. The proportional control valve system of claim 1, wherein the stored executable instructions when executed cause the computing device to control the electric motor to produce a first amount of torque to establish a drop tight seal when the sealing structure is in the closed position, and to produce a second amount of torque to maintain the drop tight seal when the sealing structure is in the closed position, which second amount of torque is less than the first amount of torque.

7. A proportional control valve system, comprising:
   a proportional control valve having a sealing structure, an inlet flow passage, and an outlet flow passage, the sealing structure positionable in a closed position, a fully open position, and a plurality of partially open positions there between;
   an electric motor;
   a gearbox in driving communication with the electric motor;
   a worm gear drive in driving communication with the gearbox, and in driving communication with the sealing structure of the proportional control valve;
   a drive having a computing device in communication with a memory device storing executable instructions, the instructions when executed causing the computing device to control the positioning of the sealing structure within the proportional control valve; and
   a fluid powered actuator in communication with the worm gear drive and a reserve source of fluid power adequate for the fluid powered actuator to actuate the sealing structure of the proportional control valve.

8. The proportional control valve of claim 7, wherein the fluid powered actuator is hydraulically powered or pneumatically powered, and the reserve source of fluid powered is an accumulator.

9. A method of operating a proportional control valve system, comprising:
   providing a proportional control valve system that includes a proportional control valve, an electric motor, a gearbox, a worm gear drive, and a drive, wherein:
      the proportional control valve has a sealing structure, an inlet flow passage, and an outlet flow passage, the sealing structure positionable in a closed position, a fully open position, and a plurality of partially open positions there between;
      the gearbox is in driving communication with the electric motor;
      the worm gear drive is in driving communication with the gearbox, and in driving communication with the sealing structure of the proportional control valve; and
      the drive includes a computing device in communication with a memory device storing executable instructions;
   using the computing device to execute the stored instructions to positionally control the sealing structure within the proportional control valve; and
   controlling an amount of torque produced by the electric motor as a function of fluid pressure within the proportional control valve.

10. The method of claim 9, wherein the proportional control valve system further includes a first positional indicator and a second positional indicator, the first positional indicator in communication with the electric motor, and configured to indicate a rotational position of a rotational output shaft of the electric motor, the second positional indicator configured to indicate the position of the sealing structure within the proportional control valve; and
   wherein the step of using the computing device to execute the stored instructions to positionally control the sealing structure within the proportional control valve includes controlling an output shaft of the motor to a rotational position based on input from one or both of the first positional indicator or the second positional indicator, which motor rotational position corresponds to a desired position of the sealing structure within the proportional control valve.

11. The method of claim 9, further comprising controlling a rate of linear movement of the sealing structure within the proportional control valve by controlling a rotational speed of the electric motor.

12. The method of claim 11, wherein the step of controlling the rate of linear movement of the sealing structure further includes controlling at least one of an acceleration or a deceleration of the sealing structure within the proportional control valve.

13. The method of claim 9, further comprising producing a first amount of torque to establish a drop tight seal when the sealing structure is in the closed position, and producing a second amount of torque to maintain the drop tight seal when the sealing structure is in the closed position, which second amount of torque is less than the first amount of torque.

14. The method of claim 9, wherein the proportional control valve system further comprises a fluid powered actuator in communication with the worm gear drive and a reserve source of fluid power adequate for the fluid powered actuator to actuate the sealing structure of the proportional control valve; and operating the fluid powered actuator to actuate the sealing structure of the proportional control valve.

15. The method of claim 14, wherein the fluid powered actuator is hydraulically powered or pneumatically powered, and the reserve source of fluid powered is an accumulator.

16. The method of claim 14, wherein the step of operating the fluid powered actuator to actuate the sealing structure of the proportional control valve is performed when the electric motor is inoperable.

\* \* \* \* \*